United States Patent [19]

Yoshino et al.

[11] 4,051,898

[45] Oct. 4, 1977

[54] STATIC HEAT-AND-MOISTURE EXCHANGER

[75] Inventors: Masataka Yoshino; Atsushi Oguri, both of Nakatsugawa, Japan

[73] Assignee: Mitsubishi Denki Kabushiki Kaisha, Japan

[21] Appl. No.: 246,994

[22] Filed: Apr. 24, 1972

Related U.S. Application Data

[63] Continuation-in-part of Ser. No. 20,303, March 17, 1970, abandoned.

[30] Foreign Application Priority Data

| Mar. 20, 1969 | Japan | 44-21477 |
| May 8, 1969 | Japan | 44-35421 |
| May 12, 1969 | Japan | 44-43466[U] |
| Aug. 20, 1969 | Japan | 44-79026[U] |

[51] Int. Cl.² ............................................. F28F 3/12
[52] U.S. Cl. ...................................... 165/166; 261/83
[58] Field of Search ...................... 165/57, 166, 67; 261/112, 29, 83

[56] References Cited

U.S. PATENT DOCUMENTS

| 2,478,617 | 8/1949 | Anderegg | 165/57 X |
| 2,986,379 | 5/1961 | Kramig, Jr. | 261/28 |
| 3,065,956 | 11/1962 | Meek | 261/83 X |
| 3,166,122 | 1/1965 | Hryniszak | 165/166 |
| 3,398,510 | 8/1968 | Pennington | 261/83 X |
| 3,666,007 | 5/1972 | Yoshino et al. | 165/166 |

Primary Examiner—Carroll B. Dority, Jr.
Assistant Examiner—Theophil W. Streule, Jr.
Attorney, Agent, or Firm—Robert E. Burns; Emmanuel J. Lobato; Bruce L. Adams

[57] ABSTRACT

A static heat-and-moisture exchanger core comprises an enclosed shell structure having a plurality of heat-and-moisture transfer members statically disposed therein in superposed and spaced-apart relationship defining between each two adjacent members a static flow path. The shell structure has a box-shaped configuration having four side walls and contains numerous pairs of aligned openings in opposed side wall portions each pair opening into one of the flow paths. Each heat-and-moisture transfer member is composed of either Japanese paper or asbestos paper having a thickness of from 0.05 mm to 1.0 mm whereupon the laminations are heat conductive and moisture permeable to effect continuous and simultaneous heat and moisture exchange between two air streams flowing through alternate ones of the flow paths.

9 Claims, 16 Drawing Figures

FIG. 6
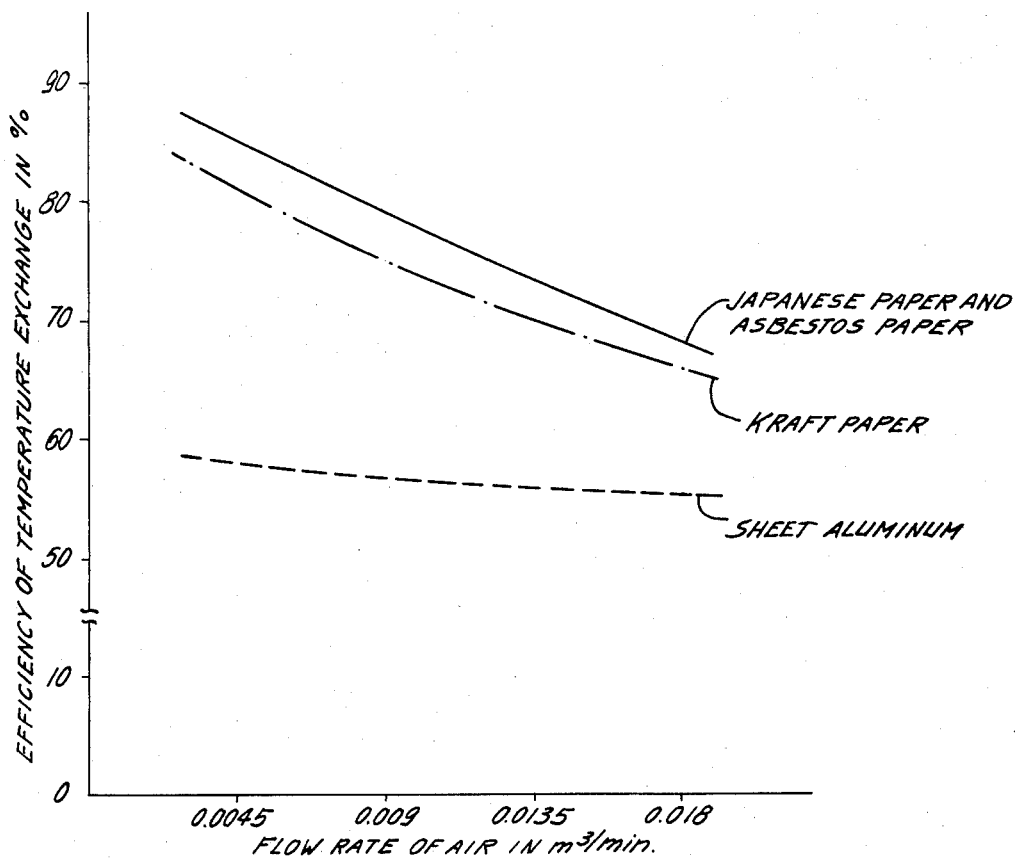
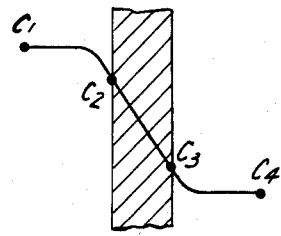
FIG. 15A
THE DISTRIBUTION OF
WATER VAPOR CONCENTRATION
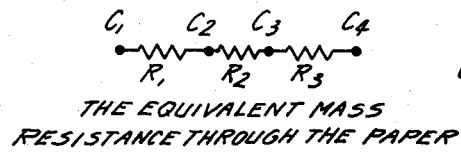
FIG. 15B
THE EQUIVALENT MASS
RESISTANCE THROUGH THE PAPER ature and humidity. For example, in Japan, the outdoor atmospheric air has a very high temperature and humidity as compared to the prevailing conditions inside most rooms whereas in the winter months, the outdoor temperature and humidity are quite low as compared to the prevailing and comfortable conditions within the rooms.

STATIC HEAT-AND-MOISTURE EXCHANGER

This application is a continuation-in-part of U.S. patent application Ser. No. 20,303 filed on Mar. 17, 1970 and now abandoned.

The present invention pertains to heat-and-moisture exchangers and more particularly, pertains to a static heat-and-moisture exchanger core for effecting continuous and simultaneous exchange of both heat energy and water vapor between two air streams.

Ventilating devices are presently used in many commercial and residential buildings to ventilate individual rooms of the building. In general, the ventilating devices introduce fresh outside air into the room while simultaneously exhausting air from the room to the atmosphere. Oftentimes rooms become laden with smoke and other contaminants and it is desirable to discharge the dirty air from the room and replenish the lost discharged air with fresh outside air.

During the cycling of the air and ventilization of the room, it is desirable to introduce into the room fresh air having approximately the same temperature and humidity as the prevailing air in the room. This becomes particularly important during extreme climatic conditions where the room air and outdoor air vary greatly in both temperature and humidity. For example, in Japan, the outdoor atmospheric air has a very high temperature and humidity as compared to the prevailing conditions inside most rooms whereas in the winter months, the outdoor temperature and humidity are quite low as compared to the prevailing and comfortable conditions within the rooms.

Thus most ventilating devices, including air conditioners, introduce atmospheric air into the rooms during extreme climatic conditions which is much different in both temperature and humidity than the room air. This is due to the fact that the room air is maintained at a comfortably cool or warm temperature and appropriate humidity to satisfy the comforts of the human body and therefore the introduction of atmospheric air into the room necessitates additional cooling or warming of the room air accompanied by the addition or removal of moisture to or from the room air in accordance with the volume of the room air replaced with atmospheric air.

One approach to solving this problem has been to considerably increase the capability of the air conditioners to ensure that they have sufficient capacity to adequately condition the air. This approach has not been successful since it requires larger air conditioners which are more expensive to manufacture. In addition, the air-conditioners employ numerous moving parts and require a pressurized refrigerant and thus are expensive to maintain.

It is therefore a primary object of the present invention to provide a static heat-and-moisture exchanger core for simultaneously and continuously effecting both heat and moisture exchange between two air streams.

It is another object of the present invention to provide a static heat-and-moisture exchanger core for effecting continuous and simultaneous transfer of moisture and heat between two air streams in a highly efficient manner.

It is a further object of the present invention to provide a static heat-and-moisture exchanger core for continuously and simultaneously effecting exchange of both heat and moisture between two air streams without mixing the air streams.

It is yet another object of the present invention to provide a static heat-and-moisture exchanger core for continuously and simultaneously effecting exchange of both heat and moisture between two air streams and which includes no moving parts and is completely static during operation thereby greatly reducing and minimizing manufacturing and maintanence costs.

The above and other objects of the invention are carried out by providing a static heat-and-moisture exchanger comprising a shell structure divided into a plurality of separate and alternately crossing flow paths by a series of superposed and spaced-apart heat-and-moisture transfer members. Each heat-and-moisture transfer member comprises a lamination composed of a fibrous material in the form of an aggregate which is heat conductive and permeable to moisture and has a thickness of from 0.05 mm to 1 mm to allow continuous and simultaneous transfer or exchange of heat and moisture between air streams respectively flowing through alternate flow paths without interrupting the flow of either air stream and while maintaining the difference in efficiency between the temperature exchange and humidity exchange no greater than 40%. The heat-and-moisture exchanger is small in dimension and simple in construction and efficiently effects temperature and humidity exchange between the two air streams.

The construction, organization and mode of operation of the invention as well as other objects and features of the invention will become more readily apparent from the following detailed description when taken in conjunction with the accompanying drawings in which:

FIGS. 6 and 7 are graphs plotting the flow rate of air against the efficiencies of temperature exchange and humidity exchange calculated on the basis of data taken from the graphs shown in FIGS. 4 an 5;

FIGS. 15A and 15B are explanatory diagrams useful in explaining the mechanisms by which moisture is transferred through the laminations.

Figure 1:
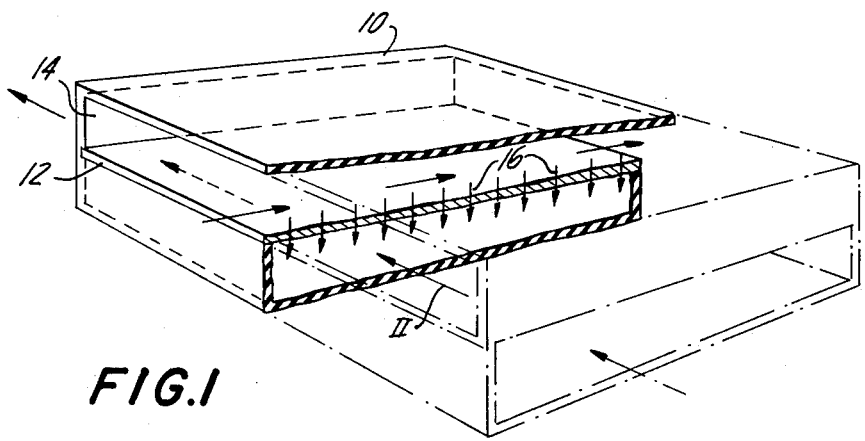
FIG. 1 is a fragmental perspective view of the most fundamental embodiment of a static heat-and-moisture exchanger constructed according to the principles of the invention with the front half thereof broken away and illustrated in phantom.

Referring now to the drawings, FIG. 1 illustrates a static heat-and-moisture exchanger core constructed in accordance with the principles of the present invention for effecting continuous and simultaneous transfer of heat and moisture between two different fluid streams. The arrangement illustrated in FIG. 1 is the most fundamental unit embodying the principles of the invention and comprises a hollow self-contained box-shaped shell structure 10 having a rectangular cross-section. The shell structure 10 may be formed of any suitable material, such as synthetic resin or metal.

A flat heat-and-moisture transfer member 12 is disposed within the shell structure 10 and divides the interior of the shell structure into a pair of vertically separated gaps or spaces 14. The gaps 14 have substantially equal vertical dimensions and therefore have substantially identical volumes. Each pair of opposite sides of the shell 10 is provided with a pair of aligned openings communication with respective ones of the gaps 14 and the remaining portion of the sides are closed. By such a construction, the gaps 14 comprise crossing flow paths separated from each other by the heat-and-moisture transfer member 12 through which fluid may flow in cross flow relationship as distinguished from concurrent or countercurrent flow relationships. For example, a primary air stream may flow through the upper flow path 14 in the direction of the arrows I and a secondary air stream may flow through the lower path 14 in the direction of the arrows II, the directions I and II being orthogonal to each other. The heat-and-moisture transfer member 12 effectively prevents physical mixing of the primary and secondary air streams.

The heat-and-moisture transfer member 12 comprises a lamination composed of a fibrous material in the form of an aggregate which is sufficiently heat conductive and sufficiently permeable to moisture to enable both heat and moisture to be transferred therethrough. Examples of the fibrous material for carrying out the objectives of the invention comprise Japanese paper and asbestos paper.

Japanese paper may be made by preparing a stock composed of long fibers of *Broussonetia Kasinoki Sieb., Edgeworthia Papyrifera Sieb., Wikstroemia Sikokiana,* Manila hemp or mixtures thereof and an adhesive such as *Hibiscus Manibot,* polyvinyl alcohol or the like in a weight ratio of 9:1 and laying the stock upon a screen or a forming wire to form a paper web on the screen or wire having a thickness corresponding to a basic weight of about 62 grams per square meter, or of about 0.13 millimeter. The length of the fibers in the raw material is preferably about 5 millimeter or more. If desired, the stock may have fibers of any suitable synthetic resin, such as rayon, added thereto in small amounts. The Japanese paper thus formed has a thermal conductivity of 0.046 kcal./m.h.°C, a moisture permeability of 3.95 g/m$^2$.h.mmHg and an air permeability of 3 sec/100c.c.

Figure 2:
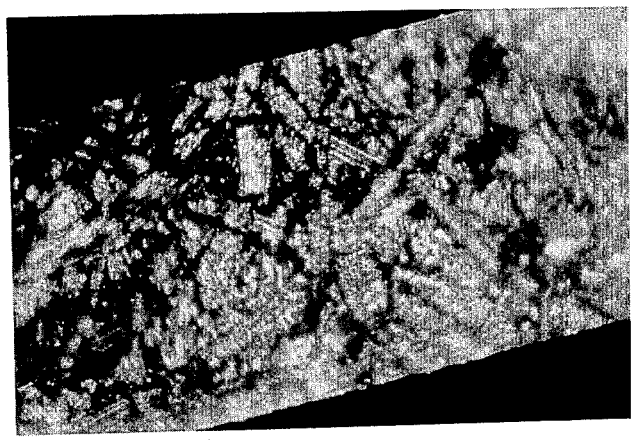
FIGS. 2 and 3 are photomicrographs respectively illustrating one surface of a lamination composed of Japanese paper and asbestos paper with a magnification of 100.

As seen in the photomicrograph of FIG. 2, which has a magnification of 100, the Japanese paper has a surface structure made up of long fibers effectively entangled with one another.

The asbestos paper preferably includes 95.3% by weight of asbestos fibers and 4.7% by weight of an adhesive, such a polyvinyl chloride, polyvinyl acetate or the like. After having been formed in the similar manner as above described with reference to the Japanese paper, the asbestos paper is passed through a nip between a pair of heated rolls and pressed to a thickness of 0.138 mm, or a basic weight of 102 g/m$^2$. The asbestos paper thus processed has a thermal conductivity of about 0.085 kcal./m.h.°C, a moisture permeability of 1.2 g/m$^2$.h.mmHg. and an air permeability of 140 sec/100 c.c..

Figure 3:
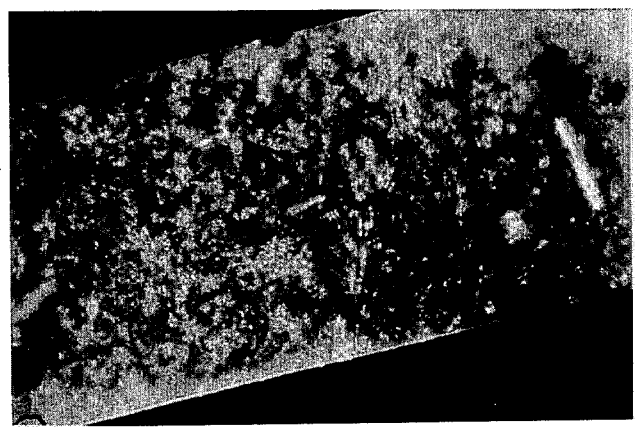

As seen in the photomicrograph of FIG. 3, which has a magnification of 100, the asbestos paper has a surface structure composed of entangled together long fibers and is substantially equal in surface structure to the Japanese paper.

During operation of the static heat-and-moisture exchanger shown in FIG. 1, a primary and a secondary air stream I and II respectively pass in cross flow relationship through the flow paths 14 as shown by the arrows and it is assumed that the primary air stream I is higher in both temperature and humidity than the secondary air stream. Under the assumed condition, some heat energy and moisture content of the primary air stream I is transferred to the secondary air stream II through the lamination 12 in the direction of the arrows 16. Therefore continuous and simultaneous transfer or exchange of both heat and moisture is effected without interrupting the flowing movement of either air stream.

The mechanisms by which the transfer or exchange of both heat and moisture is effected through the lamination will now be described. First, the heat and moisture of the primary air stream I is absorbed by that surface of the lamination 12 which contacts the primary air stream. Then the absorbed heat and moisture is transferred through the thickness of the lamination 12 by means of thermal conduction and moisture diffusion to the opposite surface thereof which contacts the secondary air stream II. Finally, the heat and moisture appearing on the opposite surface of the lamination 12 is discharged to the secondary air stream II to both heat and humidify the secondary air stream.

The actual transmission of moisture through the lamination 12 will be discussed in more detail with reference to FIGS. 15A and 15B. The moisture is transmitted through the lamination as water vapor by sequentially diffusing from the primary air stream onto one side of the lamination, diffusing from one side of the lamination through the lamination itself, to the other side thereof, and then diffusing from the other side of the lamination into the secondary air stream.

Analysis of the moisture diffusion phenomenon may best be made by examining Fick's law pertaining to steady state conditions in heat transfer applications. FIG. 15A diagrammatically shows the distribution of water vapor concentration in the primary and secondary air streams and the interposed lamination. The nodal points $C_1$, $C_2$, $C_3$ and $C_4$ represent relative water vapor concentrations of decreasing magnitude and the line interconnecting the nodal points represents the water vapor concentration profile.

The equivalent mass resistance to the transmission of water vapor through the lamination is shown in FIG. 15B. The mass resistance between nodal points $C_1$ and $C_2$ is $R_1$, that between points $C_2$ and $C_3$ is $R_2$ and that between points $C_3$ and $C_4$ is $R_3$. The mass resistance $R_1$ is defined in an analogous manner to thermal resistance and $R_1 = l/kg\ A$ where $kg$ is the mass transfer coefficient and A is the cross-sectional area of the lamination through which water vapor is transferred.

The mass resistance $R_2$ is defined as $R_2 = l/KA$ where $l$ is the thickness of the lamination and K is the permeability of the lamination, the latter parameter being obtained by the difference-thickness method which comprises comparing the quantities of water vapor passing through the lamination for different thicknesses. The mass resistance $R_3$ is the same as $R_1$.

Thus, the total mass resistance R is the sum of the mass resistances $R_1$, $R_2$ and $R_3$. By such an analysis, it may be seen tht moisture is transferred from the primary air stream to the secondary air stream by molecular diffusion and the amount of moisture transferred is dependent upon the relative moisture concentrations and the intervening mass resistance to moisture diffusion.

Due to the irregularities of both major surfaces of the lamination 12, a large surface area of the lamination is exposed to and contacts each of the air streams. In addition, the heat energy is not only transferred through the thickness of the lamination due to thermal conduction, but heat energy is also included in the moisture which is transferred through the lamination 12 thereby increasing the efficiency of heat exchange. Therefore, it will be noted that a heat-and-moisture exchanger constructed according to the principles of the present invention has a higher efficiency of temperature exchange than conventional heat exchangers which employ as the heat exchange members a metallic material, such as sheet aluminum, since though the sheet aluminum has a good thermal conductivity, it is impermeable to moisture and consequently effects heat exchange only by thermal conduction and not through the transfer of heated moisture.

This is shown in FIG. 6 wherein the efficiency of temperature exchange in percent is plotted against the flow rate of air in m³/min. As apparent from FIG. 6, it is seen that the heat exchange member composed of Japanese or asbestos paper, such as above described, is high in efficiency of temperature exchange as shown by the solid curve whereas the heat exchange formed of sheet aluminum is low in efficiency of temperature exchange as shown by the dotted curve. Kraft paper lies between the Japanese and asbestos paper and the sheet aluminum in terms of efficiency of temperature exchange and thus Kraft paper is inferior to Japanese and asbestos paper but superior to sheet aluminum with respect to efficiecy of temperature exchange. Thus it may be seen that Japanese paper and asbestos paper are superior in efficiency of temperature exchange to other types of paper and sheet metals.

In order to demonstrate the effectiveness of the invention a static heat-and-moisture exchanger such as shown in FIG. 1, was produced wherein the lamination 12 had a dimension of 110 mm × 110 mm and was composed of Japanese or asbestos paper as above described and the gaps 14 had a vertical dimension of 0.6 mm. Then the heat-and-moisture exchanger thus constructed was incorporated into a conventional ventilating device (not shown) and operated during the winter months wherein the warmed room air had an absolute humidity $hw\ 1$ of 0.0072 kg/kg and a temperature $tw\ 1$ of 20° C while the open outside air had an absolute humidity $hc\ 1$ of 0.0035 kg/kg and a temperature $tc\ 1$ of 5° C. The warmed room air with a relatively high humidity exhausted from the warmed room through one of the gaps or flow paths 14, for example the lower flow path, while at the same time, the cold dry outside air was introduced into the room through the other or upper flow path 14 of the heat-and-moisture exchanger.

Figure 4:
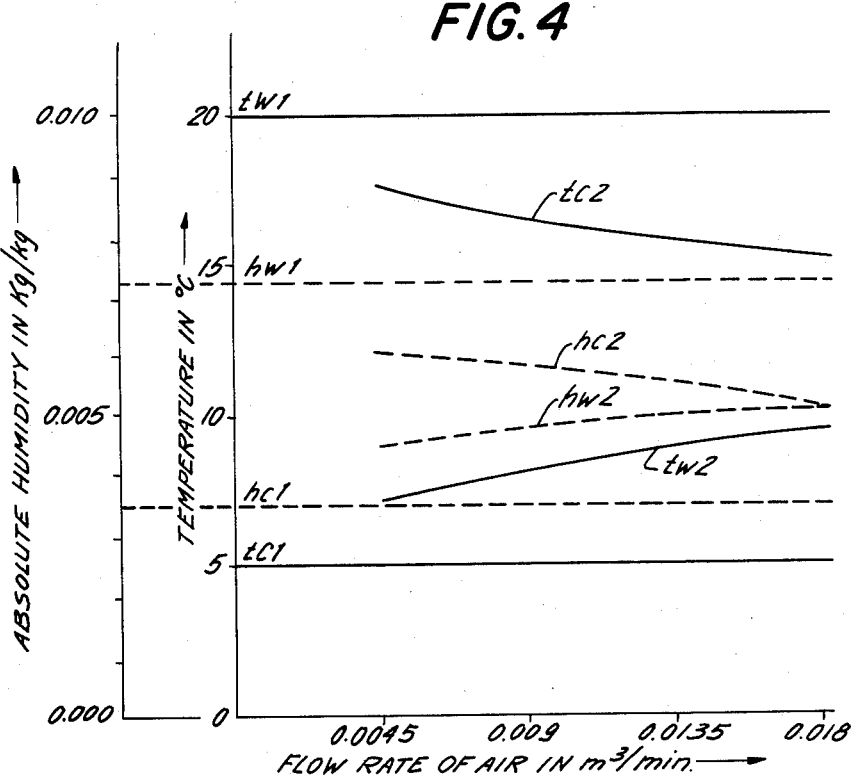
FIG. 4 is a graph plotting the temperature and absolute humidity of the entrance and discharge sides of the static heat-and-moisture exchanger verses the flow rate of air for the exchanger unit of FIG. 1 during one mode of operation.

Under these circumstances, the heat and moisture of the exhausted room air was continuously and simultaneously transferred to the open air being introduced into the room to change the temperature and humidity $tc\ 1$ and $hc\ 1$, respectively to a temperature $tc\ 2$ and a humidity $hc\ 2$ approximating the temperature and humidity $tw\ 1$ and $hw\ 1$ respectively of the room air as shown in FIG. 4 wherein both the absolute humidity in kg/kg and the temperature in °C are plotted against the flow rate of air in m³/mm. By such a construction, the open air underwent both temperature and humidity exchange with the room air prior to being introduced into the room.

It is to be noted that the temperature values $tc\ 2$ and $tw\ 2$ and the humidity values $hc\ 2$ and $hw\ 2$ of the open and room air streams refer to mean values thereof because those temperatures and humidities differ somewhat from point to point at the discharge end of the heat exchanger.

As shown in FIG. 4, the open air just prior to the entering the heat exchanger has a temperature and humidity $tc\ 1$ and $hc\ 1$ which are respectively lower than the temperature and humidity $tw\ 1$ and $hw\ 1$ of the room air after having passed through the heat exchanger. However, after having passed through the heat exchanger, the open air became higher in both temperature and humidity than the discharged room air. That is, $tc\ 2 > tw\ 2$ and $hc\ 2 > hw\ 2$. Thus the temperature and humidity are inverted between the open air and the room air.

The experiments as above described were repeated during the summer months wherein the room being cooled has an absolute humidity $hc\ 1$ of 0.01kg/kg and a temperature $tw\ 1$ of 25° C and the open outside air had an absolute humidity $hc\ 1$ of 0.0215 kg/kg and a temperature $tc\ 1$ of 30° C. The results of the summer experiments are illustrated in FIG. 5 from which it may be seen that the process as above described with reference to FIG. 4 is repeated except in this instance, both heat and moisture were transferred from the open air to the room air through the lamination 12.

Figure 5:
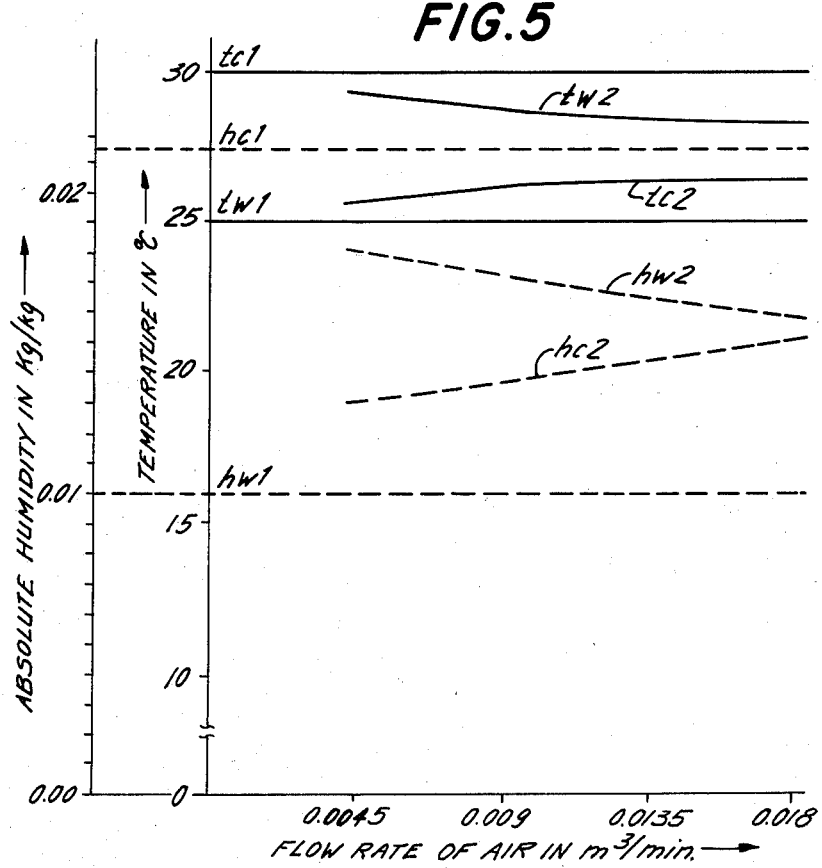
FIG. 5 is a graph similar to FIG. 4 but illustrating the same exchange unit in another mode of operation.

As is evident from FIG. 5, the open air had its temperature and humidity $tc\ 2$ and $hc\ 2$ respectively approximating the temperature and humidity $tw\ 1$ and $hw\ 1$ of the room air prior to being introduced into the room.

By similar experimentation, it was found that asbestos paper exhibits substantially the same results as does Japanese paper.

By using the parameters $tw\ 1$, $tc\ 1$, $tc\ 2$, $hw\ 1$, $hc\ 1$ and $hc\ 2$ as above described, the efficiencies of temperature exchange E and humidity exchange H may be calculated for the primary air stream (the open outside air to be introduced into the room) relative to the secondary air stream (the room air to be exhausted from the room) in accordance with the following questions:

$$E = \left| \frac{tc2 - tc1}{tw1 - tc1} \right| \times 100\%$$

and $$H = \left| \frac{hc2 - hc1}{hw1 - hc1} \right| \times 100\%$$

Figure 7:
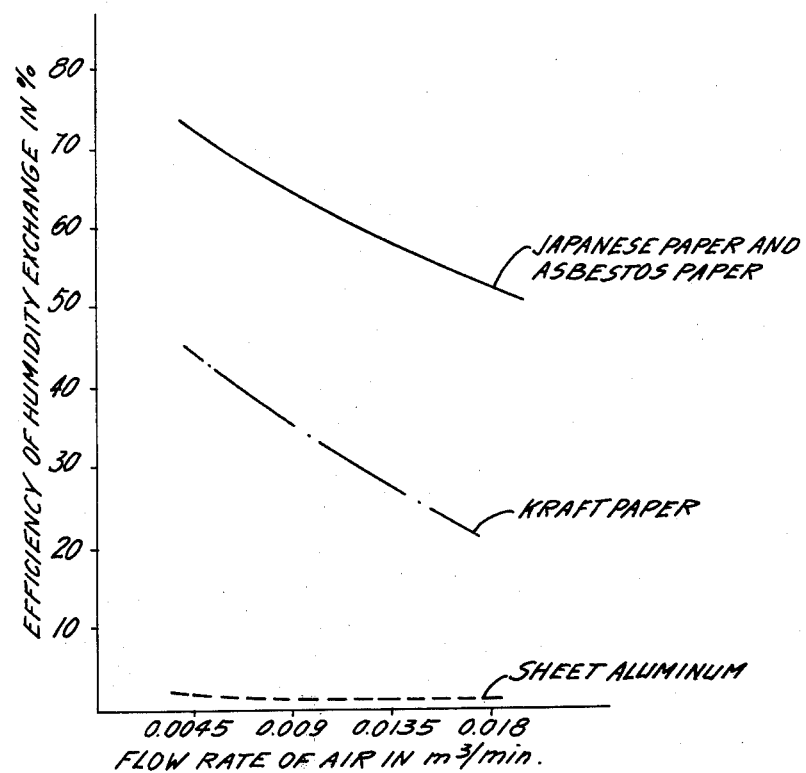

On the basis of the data shown in FIGS. 4 and 5, the efficiencies E and H were calculated for both the summer and winter months. The calculated efficiencies of exchange E and H for both the summer and winter months were substantially the same and representative graphs are shown in FIGS. 6 and 7 wherein the efficiencies of temperature exchange and humidity exchange in percent are plotted against the flow rate of air in m³/mm.

Figure 8:
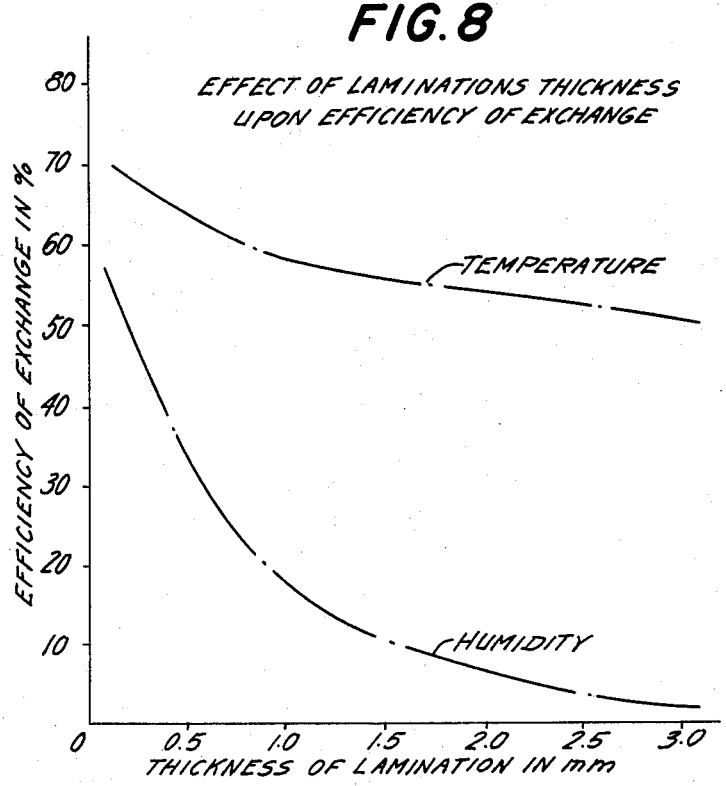
FIG. 8 is a graph illustrating the relationship between the thickness of the lamination and the efficiencies of temperature exchange and humidity exchange for the exchanger unit shown in FIG. 1.

FIG. 8 shows the effect of the thickness of the lamination upon the efficiencies of both temperature exchange and humidity exchange. In FIG. 8 the two efficiencies of exchange in percent are plotted against the thickness of the lamination 12 in millimeters with the flow rate of air maintained at a constant 0.0071 cubic meters per minute. As seen in FIG. 8, as the thickness of the lamination increases, the efficiency of humidity exchange drops more rapidly than does the efficiency of temperature exchange.

In practicing the invention, it is essential to maintain the difference between the efficiencies of temperature and humidity exchange at a value not greater than 40% for reasons which will be described hereinafter. As shown in FIG. 8, when the thickness of the lamination exceeds about 1 mm, the difference between both efficiencies of exchange exceeds 40%. On the other hand, if the lamination has a thickness less than 0.05 mm, it is very difficult to handle and assembly because it is very easily broken. Thus it may be seen that the thickness of the lamination should preferably range from 0.05 to 1.0 mm.

By experimentation, if has been found that if the difference between the efficiencies of temperature exchange and humidity exchange exceeds 40%, then one of the major surfaces of the lamination exposed to the air streams begins to have dew form thereon and such causes rapid ageing of the lamination. The dewing of the lamination will now be described, assuming that the primary air stream comprising the open outside air to be introduced into the room has a temperature of 32° C and an absolute humidity of 0.0229 kg/kg corresponding to a relative humidity of 75% while the secondary air stream comprising the room air to be exhausted form the cooled room has a temperature 20° C and an absolute humidity of 0.0075 kg/kg corresponding to a relative humidity of 50%. It is also assumed that the primary and secondary air streams have passed through a combined heat-and-moisture exchanger such as shown in FIG. 1 wherein continuous and simultaneous transfer of both heat and moisture occurred between the air streams at an efficiency of temperature exchange of 60%, an efficiency of humidity exchange of 20% resulting in a different between the efficiencies of 40%.

Under the assumed conditions, after having passed through the heat exchanger, the primary air stream will have a temperature $tc2 = 24.8°$ C calculated from the efficiency equation and solving for the temperature tc 2 in the following expression: 0.60 = (32 − tc2)/(32 − 20). In a similar manner, the primary air will have an absolute humidity $hc2 = 0.0198$ kg/kg calculated from the following expression: 0.20 = (0.0229 − hc2)/(0.0075).

Figure 9:
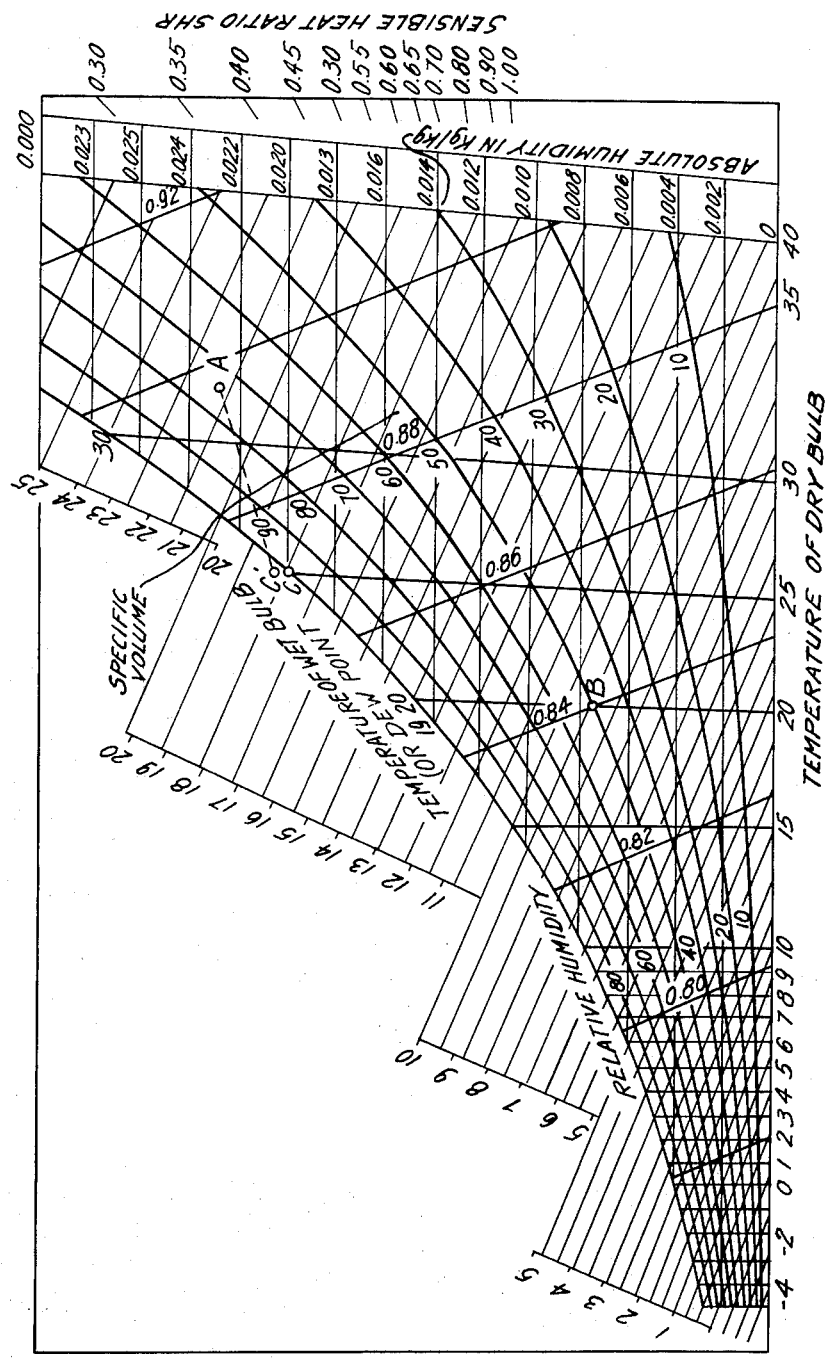
FIG. 9 is a Mollier chart for wet-bulb and dry-bulb hygrometers useful in explaining the mechanism by which the unit heat exchanger shown in FIG. 1 is dewed.

The calculated absolute humidity can be converted into a relative humidity by using a well known Mollier chart for wet-and dry-bulb hygrometers as shown in FIG. 9, points A and B designate respectively the status of the primary and secondary air streams prior to entering the heat-and-moisture exchanger. After having passed through the heat-and-moisture exchanger, the primary air stream changes its status from point A to point C lying on a line representing a relative humidity of 100% since the primary air stream is saturated with water but does not yet dew the exposed surface of the lamination.

Under these circumstances, the efficiency of temperature exchange is maintained at 60% while the efficiency of humidity exchange may fall to 15% resulting in a difference therebetween amounting to 45%. In the latter event, primary air stream having the heat-and-moisture exchanger will still have a temperature of 24.8° C and an absolute humidity $hc2 = 0.0206$ kg/kg calculated from the following expression: 0.15 = (0.0229 − hc2)/(0.0229 − 0.0075). Thus the primary air stream assumes the status represented by point C in FIG. 9 and has a relatively humidity above 100% with the result that surface of the lamination exposed to the primary air stream has drops of water formed on the discharge end portion.

Figure 10:
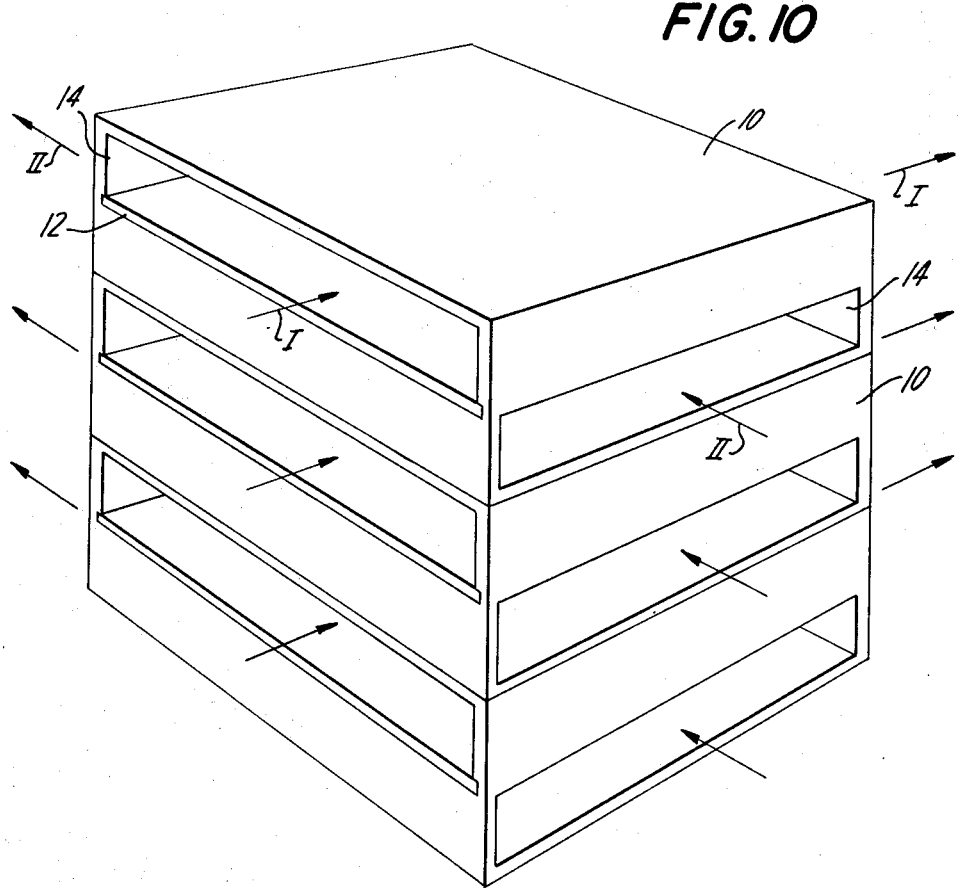
FIG. 10 is a perspective view of a static multi-layer heat-and-moisture exchanger compsoed of a plurality of unit heat exchangers such as shown in FIG. 1 superposed on one another.

Referring now to FIG. 10, wherein like reference numerals designate the components identical to those shown in FIG. 1, there is illustrated a stack of static heat-and-moisture exchangers as shown in FIG. 1 superposed on one another to form a static multi-layer heat-and-moisture exchanger. In the arrangement of FIG. 10, alternate ones of the gaps 14 form one set flow paths through which a fluid may flow in one direction and the remaining gaps 14 form the other set of flow paths through which another fluid may flow in the other direction. The two flow directions are in crossing perpendicular relationship with respect to each other to ensure maximum energy through transfer. Thus the arrangement of FIG. 10 can handle mush larger volumes of the primary and secondary air streams as compared with that shown in FIG. 1.

Figure 11:
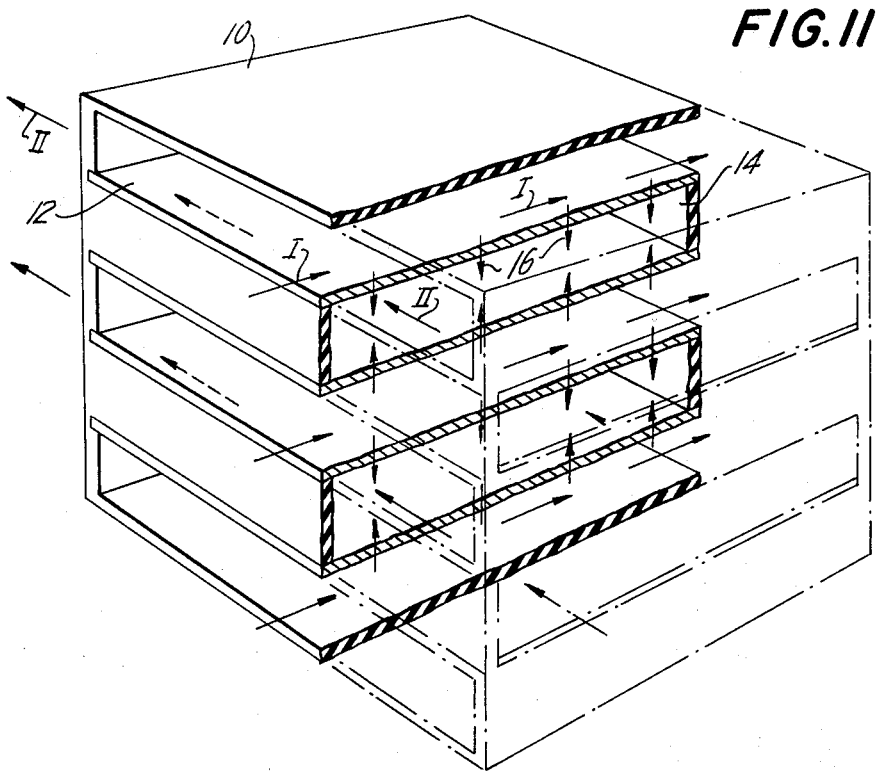
FIG. 11 is a fragmental perspective view of a modification of the arrangement shown in FIG. 10 with the front half thereof as viewed in FIG. 11 broken away and illustrated in phantom.

FIG. 11 illustrates a modification of the arrangement shown in FIG. 10 and like reference numerals designate the components corresponding to those shown in FIG. 1 or 10. The arrangement is different from that shown in FIG. 10 only in that in FIG. 11 there is provided a single shell 10 in which a plurality of heat-and-moisture laminations 12 are disposed at predetermined substantially equal spaced-apart intervals to define gaps or flow paths 14 therebetween. As in the arrangement of FIG. 10, a first fluid stream, such as a primary air stream, is caused to flow through alternate ones of the flow paths 14 in one direction and a second fluid stream, such as a secondary air stream, is caused to flow through the remaining flow paths 14 in the other direction which is substantially perpendicular to the one direction, as shown by the arrows I and II. Appropriate fans or blowers are used to positively force the air streams through the flow paths, and by such a construction continuous and simultaneous exchange of both heat and moisture is effected between the adjacent portions of the primary and secondary air streams through the respective laminations 12 in the direction of the arrows 16.

Figure 12:
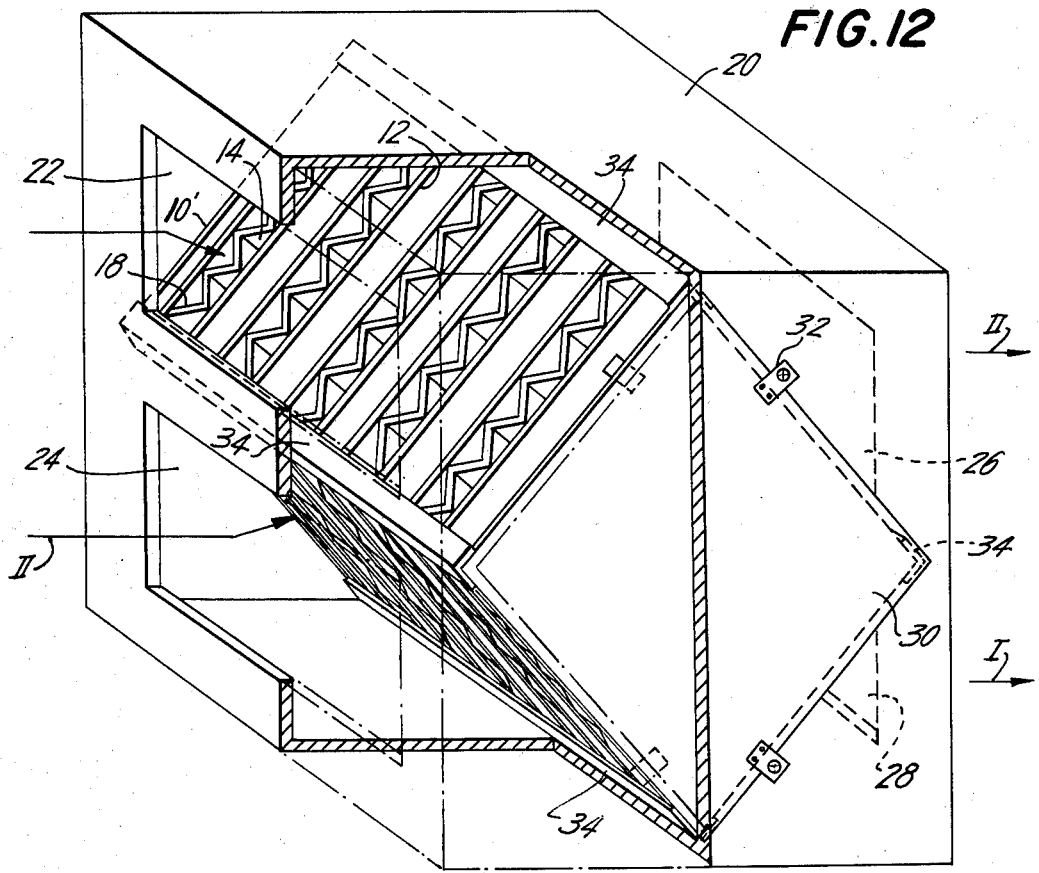
FIG. 12 is a fragmentary perspective view of one embodiment of the invention embodied into the most practical construction with the front lefthand quarter thereof as viewed in FIG. 12 of the exchanger housing broken away and illustrated in phantom.

FIG. 12 illustrates another modification of the invention more suitable for practical use and like reference numerals designate the components identical or similar to those shown in FIG. 11. A housing 20 in the form of a box having a rectangular cross-section preferably formed of any suitable metallic material is provided on the front and rear walls, or the lefthand and righthand walls as viewed in FIG. 12, with respective pairs of rectangular apertures 22, 24 and 26, 28. The pair of apertures 22 and 24 on the front wall are vertically aligned with each other and opposite to respective ones of the aperatures 26 and 28 on the rear wall. The housing 20 has a static multi-layer heat-and-moisture exchanger 10′ fixedly and statically disposed therein.

The static multi-layer heat-and-moisture exchanger 10′ comprises, in addition to the plurality of laminations 12 shown in FIG. 11, and undulated spacer 18 disposed in each of the gaps 14 sandwiched between the adjacent laminations 12 to form a multi-layer stack. The spacer is preferably composed of a kraft paper. Alternate ones of the undulated spacers 18 have their wave crests extending substantially parallel to one pair of opposite side edges of the laminations 12 to form one set of flow paths in one direction between the adjacent laminations 12 and the opposite closed sides of the associated gaps 14. Similarly, the remaining spacers 18 have their wave crests extending substantially parallel to the other pair of opposite side edges of the laminations 12 to form another set of flow paths in the other direction between the adjacent laminations 12 and the opposite closed sides of the associated gaps 14 and the two sets of flow paths cross each other at approximately a right angle.

In order to insert and remove the heat-and-moisture exchanger 10′ into and from the housing 20, the latter is provided on one side wall with a central opening complementary in shape to and slightly greater in size than the cross section of the heat-and-moisture exchanger 10′. The opening has each pair of adjacent sides inclined at substantially equal angles to the opposite edge of the side wall of the housing 20 and the opening is normally closed with a detachable cover 30 snugly fitted thereinto and releably secured to that side wall by means of set screws 32.

As shown in FIG. 12, four angle members 34 extend from the side wall with the cover 30 to the opposing side wall of the housing 20 at the respective corner of the opening and angle members are suitably fixed to the adjacent walls, that is, the front wall, the rear wall and two opposite walls disposed therebetween respectively. The angle members 34 each have a pair of legs inclined at angles of 45° to the associated wall and serve to guide and hold the least heat-and-moisture exchanger 10′.

By such an arrangement, the heat-and-moisture exchanger 10′ is accessible for maintenance, replacement, etc, simply by releasing the screws 32 to remove the cover 30 from the housing 20.

In the arrangement of FIG. 12, one air stream, for example, the primary air stream, flows through the upper aperature 22 on the front wall as an inlet port and then flows obliquely and downwardly through alternate ones of the gaps or flows paths 14, in this case, those having the undulated ends of the spacers 18 viewed in FIG. 12, and is discharged through the lower aperture 28 as an outlet port, as shown by the arrows I. The secondary air stream, the room air in this example, flows through the lower aperture 24 on the front wall as inlet port and then flows obliquely upwardly through the remaining flow paths 14 and is discharged through the upper aperture 26 on the rear wall as an outlet port. In the heat-and-moisture exchanger 10′ the exchange of both heat and moisture is effected in the manner previously described.

As an example, a static multi-layer heat-and-moisture exchanger such as shown in FIG. 12 was formed of the following components. A Japanese paper, such as above described, was cut into dimensions of 110 × 110 mm to form square laminations and a kraft paper having a basis weight of 47 grams per square meter corresponding to a thickness of 0.1 mm was used as the undulated spacers having an amplitude of 1.8 mm and a wavelength of 2.1 mm. Then the laminations and spacers were assembled in superposed spaced-apart relationship to form a stack including 110 layers having a total thickness of 220 mm with the spacing between adjacent laminations equal to 1.8 mm.

Figure 13:
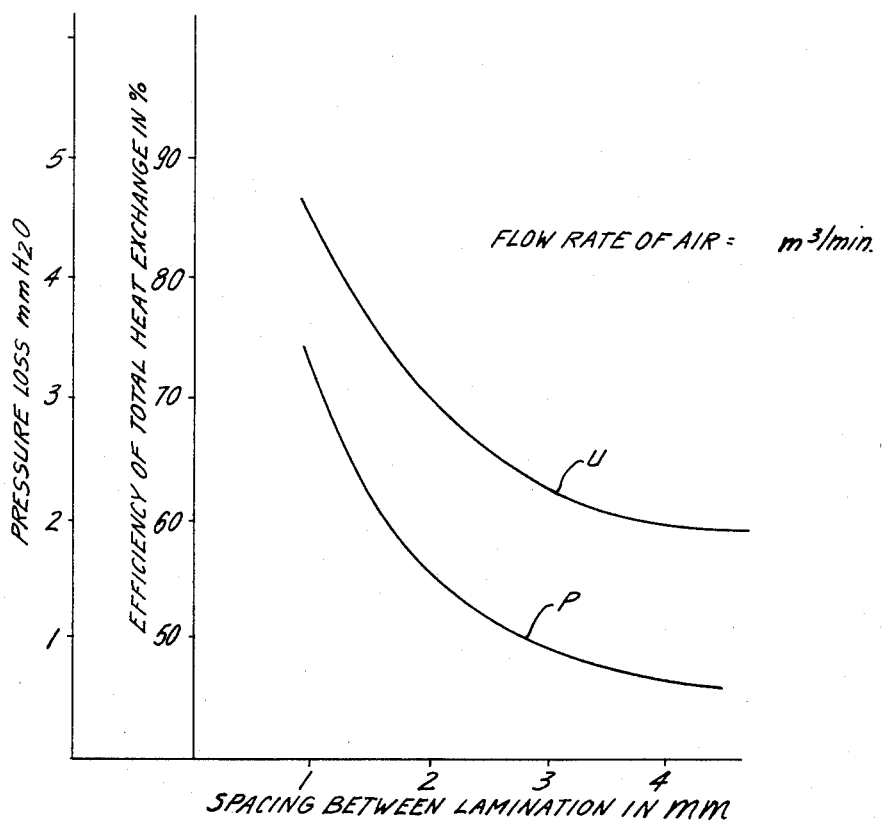
FIG. 13 is a graph plotting the spacing distance between the laminations against the pressure drop and the efficiency of total heat exchange for the arrangement shown in FIG. 13.

Experiments were conducted with the heat-and-moisture exchanger thus constructed which had the appearance shown in FIG. 12. The results of the experiments are illustrated, by way of example, in FIGS. 13 and 14. In FIG. 13, the efficiency of total heat exchange U in percent and the pressure drop p across the heat-and-moisture exchanger in mm $H_2O$ are plotted against the spacing distance in mm between each two adjacent laminations with the flow rate of air maintained at 1 $m^3$/min. The term "efficiency of total heat exchange" is defined as the efficiency of exchange resulting from the temperature exchange combined with the humidity exchange and is represented by the equation:

$$U = \frac{Uc2 - Uc1}{Uw1 - Uc1} \times 100\ \%$$

where
$Uc1$ = enthalpy of the primary air stream prior to entering the heat-and-moisture exchanger.
$Uc2$ = enthalpy of the primary air stream leaving the heat and-moisture exchanger.
$Uw1$ = enthalpy of the secondary air stream prior to entering the heat-and-moisture exchanger.
$Uw2$ = enthalpy of the secondary air stream leaving the heat-and-moisture exchanger.

As shown in FIG. 13, a spacing distance in excess of 4 mm between each pair of adjacent laminations decreases the efficiency of total heat exchange U to show an extent that the resulting heat exchanger can not be put to practical use. On the other hands, if the spacing distance is of the order of 1 mm or less the air stream through the gaps between the laminations is subject to a high enough pressure drop to render the resulting heat-and-moisture exchanger impractical. From the foregoing, it is apparent that the spacing distance between the laminations should preferably range from 1 mm to 4 mm.

Figure 14:
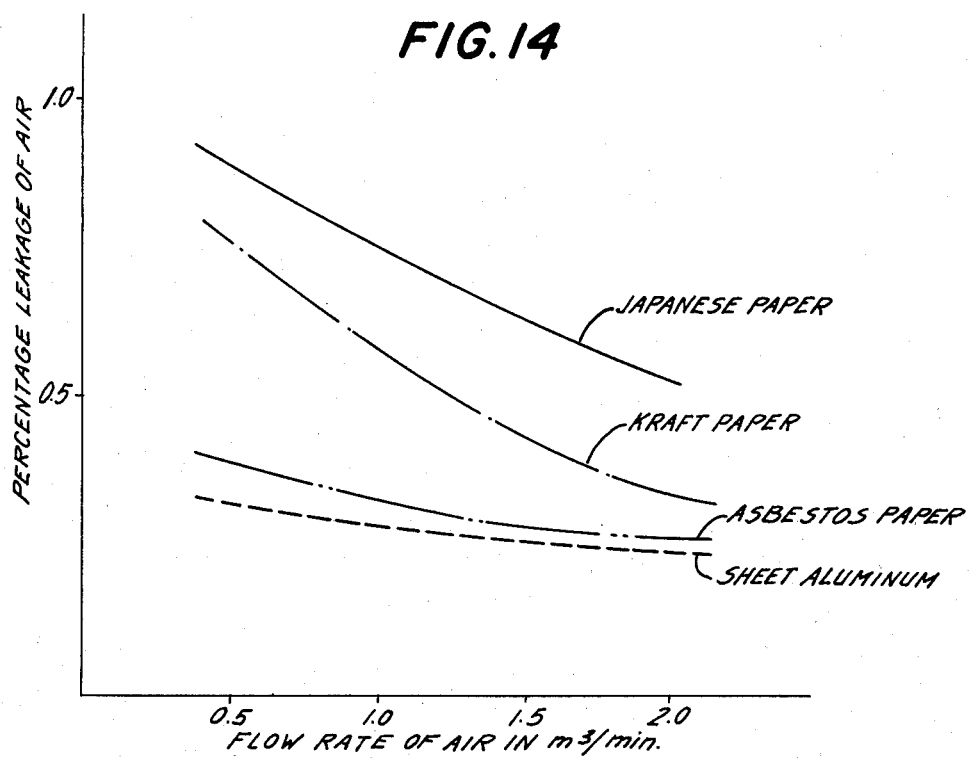
FIG. 14 is a graph illustrating the relationship between the percentage of air leakage and the flow rate of air for the arrangement shown in FIG. 13.

FIG. 14 is a graph illustrating the flow rate of air in $m^3$/min plotted against the percentage leakage at which air in the secondary air leaks into the primary air through and around the laminations for different lamination materials. The leakage of air results from the fact that since the laminations are formed of a fibrous material permeable to moisture, the laminations themselves are permeable to air to some extent and also from the fact that very narrow clearances or spaces exist between the laminations and the adjacent portions of the housing which will readily be understood from the lowermost or dotted curve shown in FIG. 14 depicting sheet aluminum which is not at all permeable to gas. From FIG. 14, it is seen laminations composed of Japanese paper provide a leakage of air less than 1% which is negligibly small for all practical purposes.

In FIG. 14, the uppermost solid curve depicts Japanese paper as previously described and the dashed curve represents asbestos paper. The dotted-and-dashed curved and the above-mentioned lowermost curve are provided for the purpose of comparing lamination materials of the present invention with conventional materials capable of forming the laminations. For the same purpose, FIGS. 6 and 7 illustrate kraft paper and sheet aluminum in terms of their efficiencies temperature exchange and humidity exchange respectively.

Many obvious modifications of the afore-described embodiments will become apparent to those skilled in the art and the present invention is intended to cover all such modifications falling within the scope and spirit of the invention as described in the appended claims.

What we claim is:

1. A static heat-and-moisture exchanger core for transferring both heat and moisture between two fluid streams comprising: an enclosed shell structure having means therein defining a plurality of openings; and heat-and-moisture transfer means statically disposed within said shell structure dividing the interior thereof into two static flow paths each communicating at opposite ends with one of said openings for effecting continuous and simultaneous transfer of both heat and moisture between two fluid streams having different temperatures and humidities flowing through respective ones of said static flow paths during use of the heat-and-moisture exchanger while the same is in a static state, said heat-and-moisture transfer means comprising a member disposed within and dividing the interior of said shell structure into said two static flow paths, said member being composed of a lamination consisting of an aggregate of fibrous material having a thickness of from 0.05 to 1 mm and which is sufficiently thermally conductive and sufficiently permeable to moisture to permit both temperature and humidity exchanges between the two fluid streams to be simultaneously and continuously effected through said member without intermixing of the fluid streams while maintaining the difference in efficiencies between the temperature and humidity exchanges at a value no greater that 40%.

2. A static heat-and-moisture exchanger core according to claim 1; wherein said lamination comprises Japanese paper composed of fibers selected from the group consisting of *Broussonetia Kasinoki Sieb., Edgeworthia Papyrifera Sieb., Wikstroemia Sikokiana* and Manila hemp and an adhesive selected from the group consisting of *Hibiscus Manibot* and polyvinyl alcohol.

3. A static heat-and-moisture exchanger core according to claim 1; wherein said lamination comprises asbestos paper composed of asbestos and an adhesive selected from the group consisting of polyvinyl chloride and polyvinyl acetate.

4. A static heat-and-moisture exchanger core according to claim 1; wherein said plurality of openings are positioned relative to each other to orientate said two static flow paths in crossing relationship with respect to each other.

5. A static heat-and-moisture exchanger core for transferring both heat and moisture between two fluid streams comprising: an enclosed shell structure having means therein defining a plurality of openings; and heat-and-moisture transfer means statically disposed within said shell structure dividing the interior thereof into a series of superposed static flow paths each communicating at opposite ends with one of said openings for effecting continuous and simultaneous transfer of both heat and moisture between two fluid streams having different temperatures and humidities respectively flowing through alternate ones of said static flow paths during use of the static heat-and-moisture exchanger while the same is in a static state, said heat-and-moisture transfer means comprising a plurality of members disposed with and dividing the interior of said shell structure into said series of superposed static flow paths, said members being composed of a lamination consisting of an aggregate of fibrous material having a thickness of from 0.05 to 1 mm and which is sufficiently thermally conductive and sufficiently permeable to moisture to permit both temperature and humidity exchanges between the two fluid streams to be simultaneously and continuously effected through said members without intermixing of the fluid streams in adjacent flow paths while maintaining the difference in efficiencies between the temperature and humidity exchanges at a value no greater that 40%.

6. A static heat-and-moisture exchanger core according to claim 5; wherein each lamination comprises Japanese paper composed of fibers selected from the group consisting of *Broussonetia Kasinoki Sieb., Edgeworthia Papyrifera Sieb., Wikstroemia Sikokiana* and Manila hemp and an adhesive selected from the groups consiting of *Hibiscus Manibot* and polyvinyl alcohol.

7. A static heat-and-moisture exchanger core according to claim 5; wherein each lamination comprises asbestos paper comprosed of asbestos and an adhesive selected from the group consisting of polyvinyl chloride and polyvinyl acetate.

8. A static heat-and-moisture exchanger core according to claim 5; wherein said plurality of openings are positioned relative to each other to orientate said series of static flow paths in alternate crossing relationship with respect to each other.

9. A static heat-and-moisture exchanger according to claim 5; wherein said members are disposed at substantially equal intervals of from 1 to 4 mm.

* * * * *